United States Patent

[11] 3,599,003

[72] Inventors Donald E. Price
Mountain View;
Joseph Kriensky, Sunnyvale; Carl J.
Lamberson, Cupertino, all of, Calif.
[21] Appl. No. 841,388
[22] Filed July 14, 1969
[45] Patented Aug. 10, 1971
[73] Assignee Lockheed Aircraft Corporation
Burbank, Calif.

[54] COLLIMATED FIELD OF VIEW LIGHT PEN
5 Claims, 2 Drawing Figs.

[52] U.S. Cl. .... 250/219CR, 250/217 CR, 250/227
[51] Int. Cl. .... G06k 9/00
[50] Field of Search .... 250/211, 227, 239, 216, 219 CR, 237, 221, 217 CR

[56] References Cited
UNITED STATES PATENTS

| | | | |
|---|---|---|---|
| 2,879,405 | 3/1959 | Pankove | 250/211 |
| 3,062,964 | 11/1962 | Lubin | 250/227 |
| 3,099,750 | 7/1963 | Swarthout et al. | 250/239 |
| 3,335,285 | 8/1967 | Galley, Jr. et al. | 250/221 |
| 3,460,143 | 8/1969 | Vaccaro | 250/219 X |
| 3,483,387 | 12/1969 | Davis, Jr. | 250/216 |

*Primary Examiner*—Walter Stolwein
*Attorneys*—Paul F. Morgan and George C. Sullivan

ABSTRACT: A light pen in a visual display information system is disclosed. The light pen has a fully collimated field of view and is responsive only to visual information within a constant area on a visual display screen, independent of the distance of the light pen from the display screen. The light pen includes a first aperture with an area equal to the desired field of view on the display screen, and a lens which focuses light rays entering the first aperture parallel to the lens axis at a pinhole light filter. The focused light passes through the pinhole to a photoelectric detector. The pinhole is at the focal point of the lens to accept only light rays parallel to the lens axis.

Figures 1, 2:
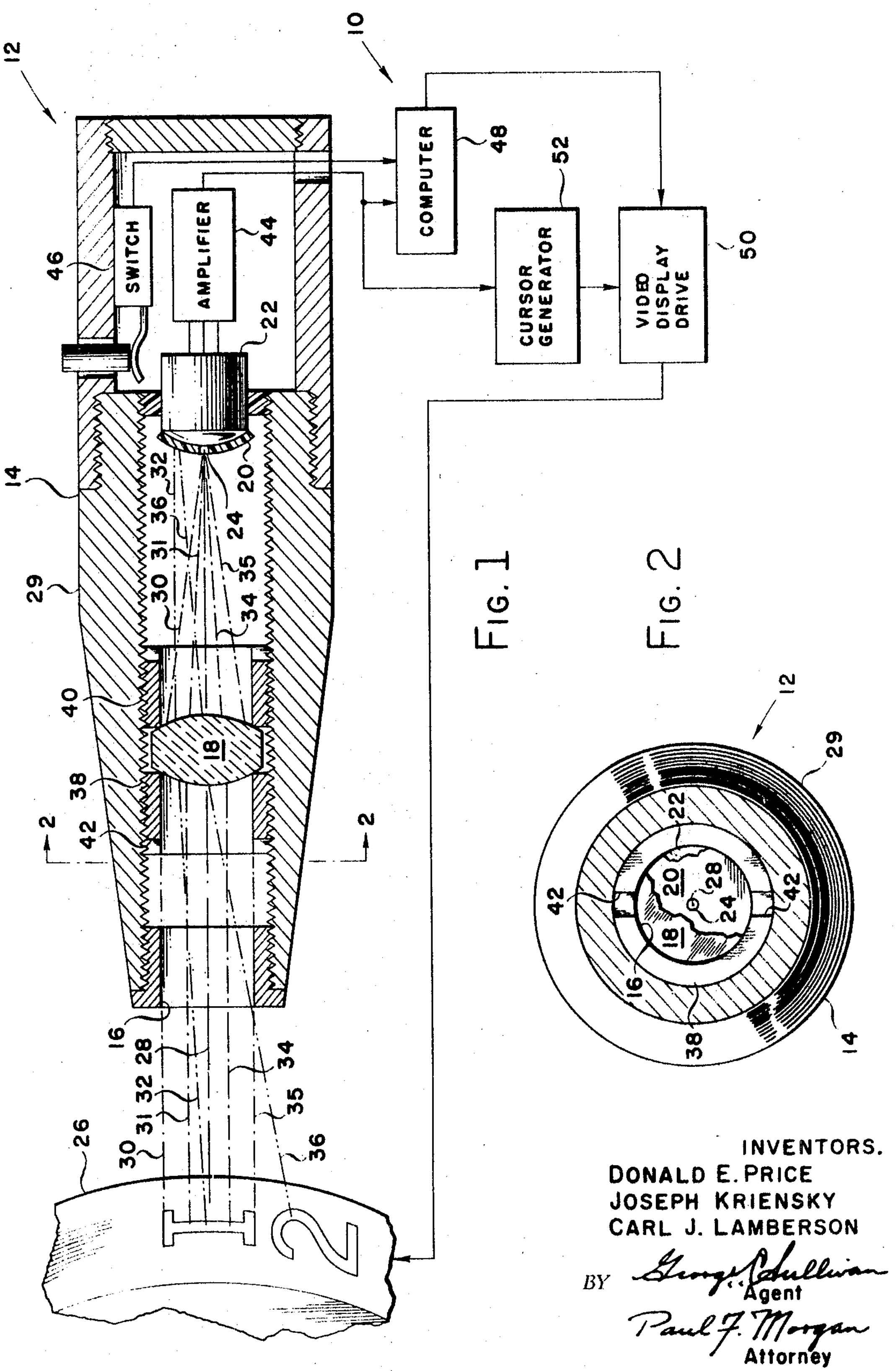

INVENTORS.
DONALD E. PRICE
JOSEPH KRIENSKY
CARL J. LAMBERSON

BY George J. Sullivan
Agent
Paul F. Morgan
Attorney

COLLIMATED FIELD OF VIEW LIGHT PEN

The present invention relates to an operator-aimed light pen for information systems having a visual display screen. The light pen accurately responds only to selected, limited visual information indicia on the visual display screen, independent of the distance of the light pen from the visual display screen.

The use of visual display screens, such as cathode-ray tubes, as terminal devices in information systems has been widespread for many years and is increasing in importance. Such arrangements allow individuals who are not skilled in the computer art to readily select and control information from a computer or information storage device. Most desirably, the information is selected by the operator simply manually aiming a small light pen at selected information on the display screen. Various efforts over the years have been exerted in this art to develop adequate light pen structures, particularly those suitable for unskilled personnel. Examples of such light pens and associated information systems are illustrated, for example, in U.S. Pat. Nos. 2,915,643; 3,130,317; 3,151,248; 3,337,860; and 3,346,853; and in U.S. Pat. Application Ser. No. 653,834, filed July 17, 1967, issued Jan. 27, 1970, as U.S. Pat. No. 3,492,657 by Garry J. Cleveland and entitled "Light Sensitive Detector and Time-Correlated Generator." The present invention provides a light pen with improved characteristics over the light pens shown in the above references, yet suitable for use in any of the information systems illustrated therein. The teachings of appropriate information systems in these references are incorporated herein by reference, and accordingly the details of an exemplary information system associated with the present light pen need not be described herein in detail. Existing light pens in such information systems may be replaced or modified in accordance with the teachings of the present invention to thereby provide light pens having the advantages of the present invention.

The prior art light pens referenced above have a serious inherent operating defect, particularly for inexpert operators. These prior light pens do not provide a truly collimated field of view and do not allow the light pens to be held at any convenient distance from the visual display screen while being operated, i.e., allow the light pen to be held in varying positions and yet respond only to information appearing within a constant area of the visual display screen. A very accurately defined and constant area field of view is essential for accurate information control, as, for example, distinguishing directly adjacent alpha-numeric characters on the display screen. Many of the prior art systems have utilized a light pen which to operate must be pressed directly against the display screen face, over the selected information. This has obvious disadvantages. Others of these prior art systems have used fiber optics, elongated tubes, very small input light apertures, etc., in an unsuccessful effort to achieve a collimated field of view which would allow light pen operation at any significant distance from the display screen. Further, the dimensions of some of these systems are unwieldy for hand aiming by the operator. The cited U.S. Pat. No. 2,915,643 shows a light pen which operates only at a single fixed distance from the screen face, which distance must be maintained by holding a mechanical spacing rod on the light pen against the display screen.

In contrast, the light pen of the invention is a small, compact and easily operator-aimed device suitable for an unsophisticated operator. It provides a fully collimated field of view, i.e., a constant viewing area independent of the distance from the light pen to the visual display screen. It provides electrical output signals to an associated information system only in response to light information within said constant field of view. The light pen invention may be held at any convenient distance form the video display screen and this distance may be varied during operation without affecting the light pen operation. These desired operating features are achieved by a simple mechanical arrangement suitable for new or existing light pen systems. High photoelectric discrimination and sensitivity is provided with conventional photoelectric detectors and amplifiers.

Further objects, features and other advantages of the present invention pertain to the particular arrangement and structure whereby the above-mentioned aspects of the invention are obtained. The invention will be better understood by reference to the following discussion and to the drawings forming a part thereof, which are substantially to an enlarged scale as to the light pen, wherein:

FIG. 1 is a schematic diagram of an information system in accordance with the present invention with the light pen therein shown in central axial cross-sectional detail; and FIG. 2 is a cross-sectional view taken along the line 2–2 of FIG. 1.

Referring to the drawings, FIGS. 1 and 2, there is shown an exemplary information system 10 incorporating an exemplary light pen 12 in accordance with the present invention. For clarity, the light pen 12 is shown in detail (except for conventional electronics therein), while the other components of the information system 10 are illustrated schematically. This is preferable since all of these other components may be conventional ones well known to those skilled in the art, fully exemplified in the above-cited references, and commercially available from a number of manufacturers.

It will be understood that the term "light pen" is used herein and in the related art to describe any type or shape of operator movable photoelectric apparatus responsive to an aimed-at area of a video display screen.

Considering in detail the light pen 12 herein, it may be seen that there is an elongate generally cylindrical light pen body 14 within which are coaxially arranged a first aperture 16, a lens 18, a light mask 20 and a photoelectric detector 22 in series along a common central axis 28. Light rays entering the first aperture 16 parallel the central axis 28 are also parallel the axis of the lens 18 and are focused by the lens 18 at its focal point. This focal point is located at a pinhole light aperture 24 in the light mask 20, and thereby these initially parallel light rays pass through the light mask 20 to activate the photoelectric detector 22.

It may be seen from FIG. 1 that the front portion of the light pen body 14 comprises a separate front member 29 threadably secured to the remainder of the light pen body. This front member 29 contains all of the above-described optical elements 16, 18, 20 and 22 and may be substituted as a unit for the front element of existing light pens.

The light pen 12 is shown in FIG. 1 aimed at a selected area of the surface of a conventional cathode-ray tube visual display screen 26. On the display screen 26 there is shown by way of example a display of two adjacent alpha-numeric characters, the letter I and the number 2. In this example, the light pen 12 is aimed so that its field of view encompasses the letter I.

Exemplary light rays 30, 31, 32, 34, 35 and 36 are shown emanating from the displayed information to illustrate the optical operation of the light pen 12. The light pen 12 is shown spaced from the display screen 26. The field of view of the light pen 12 is a cylinder of constant cross-sectional area extending from the first aperture 16. The outer edges of the field of view are illustrated by the light rays 30 and 35 here. The first aperture 16 has an opening area equal to the desired viewing area on the display screen 26. The desired viewing area here is a single-displayed character area, therefor the first aperture 16 is selected to have an area approximately equal to, and not substantially greater than, the area occupied on the display screen 26 by an individual alpha-numeric character. Here the light pen's field of view just encompasses the single character I on the display screen. Further, the first aperture 16 is smaller in area than the lens 18.

Those light rays which are parallel to the axis of the lens 18 and coming from any part of the display screen 26 area within the collimated field of view of the light pen (exemplified here by light rays 30, 31, 34 and 35 from the I) are all focused by the lens 18 sharply at the pinhole 24. In contrast, all light rays which are not parallel the axis of the lens 18 (exemplified here by light rays 32 and 36) will be deflected by the lens 18 onto a portion of the light mask 20 other than the pinhole 24 and thereby blocked from reaching the photoelectric detector 22. No light rays outside the light pen's field of view (exemplified by the light ray 36 from the 2) can enter the first aperture 16 and also be parallel to the lens 18 axis. Therefore, none of such light rays can reach the photoelectric detector 22, as they can not be focused at the pinhole 24. The light pen 12 will respond to even a single spot of light within its field of view on the display screen from a distance of approximately 12 inches to zero distance. Yet the light pen 12 will not respond to any light on the display screen 26 outside of its field of view.

The construction of the first aperture 16, other than the area of its opening, is not critical. There is no criticality in the spacing between the first aperture 16 and the lens 18. In fact, the first aperture 16 may be defined by the periphery of the lens 18, providing there is suitable masking of the lens periphery to prevent scattering or lens edge distortions of the entering light.

The light pen body 14 here is in the general form of a cylinder, with a conical taper on the front member 29 tapering down toward a tip where the first aperture 16 is located. This conical shape provides assistance to the operator in aiming the light pen. The first aperture 16 is the only light entrance into the light pen body 14.

It may be seen that the first aperture 16, the lens 18 and the pinhole 24 are circular so as to provide a cylindrical field of view. This is preferred for a handheld light pen so that rotation of the light pen will not affect the field of view. However, it will be appreciated in certain applications it may be desirable to provide a collimated field of view of a different configuration, and this may be provided by a different configuration of the first aperture 16, for example, square.

Considering the lens 18, this may be a simple convex concentric focusing lens of plastic, glass or other suitable transparent material. The lens 18 is positioned so that its focal axis is the same as the central axis 28. The lens 18 is adapted and positioned to receive and point focus along the axis 28 at the pinhole 24 all of the light rays parallel to the axis 28 entering the light pen through the first aperture 16. Preferably the lens 18 has a relatively short focal distance so as to provide a compact light pen. Although only a single element lens is necessary, it will be understood, of course, that the term lens also encompasses a lens having more than one element.

Considering the mounting of the lens 18, it may be seen that the light pen body 14 here has a central internally threaded cylindrical passageway in which all of the optical elements are mounted. The lens 18 is mounted here in the body 14 by two threaded annular mounting rings 38 and 40. The rings 38 and 40 are externally threaded and may be screwed into the light pen body 14 by means of a pair of axial notches 42 in the sides of the rings. The rings 38 and 40 clamp opposing peripheral edges of the lens 18 to hold the lens 18 within the light pen body at a desired position. The positions of the mounting rings 38 and 40 may be accurately adjusted and present by their thread rotation within the light pen body 14. By this means the axial position of the lens 18 along the common axis 28 may be accurately adjusted so as to preset the distance between the lens 18 and the light mask 20 at the pinhole light aperture 24 along the lens axis. This distance is critical as it must be set to the focal length of the lens 18 for light rays parallel to the lens axis. That is, the lens 18 must be held in the light pen body 14 in alignment with the first aperture 16 and positioned to receive and point focus at the pinhole 24 only the light rays parallel to the lens axis entering the first aperture 16.

The light mask 20 is preferably constructed of a suitable material such as dark paint which will absorb all light falling thereon. The light mask 20 is opaque so as to prevent any light received by the light pen from passing through to the photoelectric detector 22 except at the pinhole 24. The light mask 20 is here provided by a thin coating of opaque paint covering the entire light-receiving surface of the photoelectric detector 22 except over the small area of the desired pinhole 24. This provides a thin light mask (slightly exaggerated in thickness in FIG. 1 for clarity) with a pinhole of shallow depth opening directly into the photoelectric detector 22. Thus the light-receiving surface of the photoelectric detector 22 is immediately behind the pinhole 24 and also directly at the focal point of the lens 18. It has been found that having the photoelectric detector 22 as close as possible to the pinhole and focal point increases its sensitivity. A high intensity light variation is provided on a small area of the photoelectric detector when the field of view of the light pen moves onto or off of an illuminated character on the display screen 26. Having the photoelectric detector 22 directly abutting a shallow depth pinhole also minimizes focal point inaccuracies in the lens 18 and diffraction effects, etc.

The term "pinhole" as used herein for the pinhole 24 is used in the conventional sense of a small light aperture forming a pinhole light filter. That is, the dimensions of the pinhole 24 are substantially smaller than that of the lens 18 or the first aperture 16. Preferably the diameter of the pinhole 24 is approximately one-tenth the lens diameter or less. The pinhole 24 is located on the lens and common axis 28 precisely at the point of focus of the lens 18 for light rays parallel to the lens axis.

The photoelectric detector 22 is preferably a conventional photo field effect transistor. As described above, it is mounted concentrically in the body 14 and masked by the light mask 20 except at the pinhole 24. As in the prior art, the output of the photoelectric detector 22 is preferably applied to the input of a conventional high gain amplifier 44. The amplifier 44 or subsequent amplifiers are preferably provided with conventional automatic gain control circuitry to compensate for the wide range in intensity of the light received by the photoelectric detector.

The light pen 12 also preferably further includes an operator switch 46. Both the switch 46 and the amplifier 44 may be connected to a conventional computer 48. As was indicated previously, the information system 10, other than the light pen 12 disclosed herein, may be conventional and of the types fully described in the prior art references cited at the beginning of this specification. As in these prior art information systems, the actuation of the switch 46 provides a pulse signal which causes the output from the amplifier 44 to be applied to the computer 48. The computer can then be conventionally programmed or connected to cause a change in the information being displayed on the display screen 26. This connection is illustrated here by the connection between the computer 48 and a video display drive 50, which in turn conventionally drives the display screen 26. Any suitable cursor generating system may be used in the information system 10. Preferably, as shown here, an analog (time-correlated) cursor system is provided wherein the output of the amplifier 44 is connected directly to a cursor generator 52 which generates in response a digital cursor pulse applied directly to the video display drive 50.

It may be seen that there has been provided herein an information system with a light pen having a fully collimated field of view with a constant area independent of the distance from the light pen to the visual display screen and providing electrical output signals only in response to visual information within said fully collimated field of view. While the apparatus described herein is presently considered to be preferred, it is contemplated that further variations and modifications within the purview of those skilled in the art can be made herein. The following claims are intended to cover all such variations and modifications as fall within the true spirit and scope of the invention.

What we claim is:

1. In an information system wherein information is visually displayed as a plurality of information indicia on a visual display screen and controlled by an operator in response to the visual observation by the operator of said information indicia utilizing an operator-aimed light pen containing photoelectric means responsive to operator-selected information indicia for providing selected electrical output signals to said system; the improvement in said light pen comprising:

an elongate tubular handheld light pen body having a first aperture at one end thereof for receiving light from a desired minor viewing area of said visual display screen toward which said light pen is aimed;

said light pen body being variably hand spaceable from said visual display screen;

said first aperture having an area equal to said desired viewing area on said visual display screen;

a fully opaque light mask in said light pen body, said light mask having a pinhole light aperture therethrough to form a pinhole light filter;

a light-focusing lens mounted in said light pen body with a lens axis in alignment with said first aperture and said elongate dimension of said light pen body, said lens being positioned to receive and point focus at said pinhole light aperture only light rays parallel to said lens axis entering said first aperture;

and photoelectric detector means mounted in said light pen body behind said light mask and receiving only light passing through said pinhole light aperture and providing said electrical output signals in response thereto;

said lens and said light mask at said pinhole light aperture having a preset distance therebetween along said lens axis equal to the focal length of said lens for light rays parallel to said lens axis, said light pen providing a fully collimated field of view from said first aperture with a constant area equal to said first aperture area and independent of the distance from said light pen to said visual display screen, said light pen providing said electrical output signals only in response to visual information within said fully collimated field of view.

2. The information system of claim 1 wherein said photoelectric detector means directly abuts said pinhole light aperture.

3. The information system of claim 1 wherein said light mask is an opaque material coating on the light-receiving surface of said photoelectric detector means and said pinhole is defined by a hole in said opaque material coating.

4. The information system of claim 1 further including adjustment means for accurately presetting the distance between said lens and said pinhole light aperture.

5. The information system of claim 1 wherein said information indicia comprises a plurality of alpha-numeric characters, and said first aperture has an area not substantially greater than the area occupied on said visual display screen by an individual one of said alpha-numeric characters.

5. The information system of claim 1 wherein said information indicai comprises a plurality of alpha-numeric characters, and said first aperture has an area not substantially greater than the area occupied on said visual display screen by an individual one of said alpha-numeric characters.